United States Patent [19]

Martin

[11] 3,938,866
[45] Feb. 17, 1976

[54] ROLLER CAGES FORMED FROM APERTURED SEPARATORS FOR ROLLER BEARINGS

[75] Inventor: Jacques Lucien Joseph Martin, Paris, France

[73] Assignee: Societe Anonyme dite: R.K.S., France

[22] Filed: Mar. 13, 1974

[21] Appl. No.: 450,690

[30] Foreign Application Priority Data

Mar. 27, 1973 France.............................. 73.11002

[52] U.S. Cl.................. 308/235; 308/217; 308/218
[51] Int. Cl.².......................................... F16C 33/46
[58] Field of Search ............ 308/217, 235, 202, 218

[56] References Cited
UNITED STATES PATENTS

3,501,212  3/1970  Stenert et al. ...................... 308/235

FOREIGN PATENTS OR APPLICATIONS

1,175,810  12/1969  United Kingdom.................. 308/217
698,021  10/1953  United Kingdom.................. 308/217

Primary Examiner—M. Henson Wood, Jr.
Assistant Examiner—Richard A. Bertsch
Attorney, Agent, or Firm—Stevens, Davis, Miller & Mosher

[57] ABSTRACT

A roller cage for a roller bearing assembly is made from first and second apertured separators alternately interlocked in one another. Each apertured separator has a housing provided with two apertures and a roller adapted to be received in the housing through one of the apertures where it is resiliently encased. Each housing is symmetrical about the axis of revolution of the roller and has a symmetrical center at the mid height of the axis of symmetry. The first and second separators each have two part spherical surfaces symmetrical about a plane of symmetry containing the axis of the housing and the axis of the cage with the part spherical surfaces on the first separator being convex and those of the second separator being concave. The radius of curvature of the convex surfaces is equal to the radius of the concave surface so that the two separators can interlock with each other.

12 Claims, 8 Drawing Figures

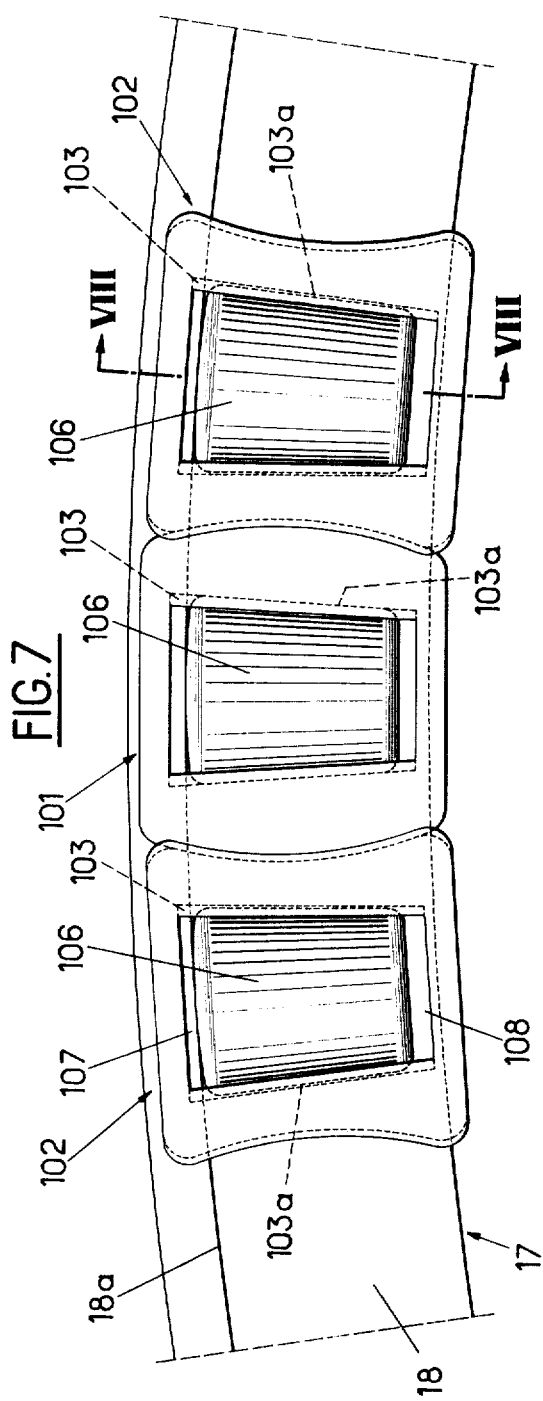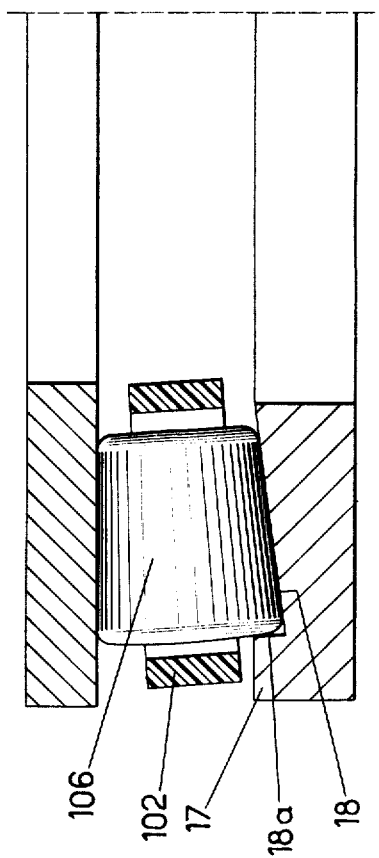

ROLLER CAGES FORMED FROM APERTURED SEPARATORS FOR ROLLER BEARINGS

BACKGROUND OF THE INVENTION

1. Field of the Invention

The present invention relates to roller bearings and is concerned with separators designed to form a cage for the rollers of roller bearings, which separators may be used in bearings of different types but having identical rollers.

2. Description of the Prior Art

Apertured separators for thrust bearings with cylindrical rollers are already known. With these apertured separators of known type, which contain a roller, two consecutive separators are in contact over cylindrical surfaces whose generatrices are parallel to the axis of the thrust bearing. Thus apertured separators of this type have a convex cylindrical portion on one side and a concave cylindrical portion on the other. In a roller cage made of consecutive separators, a concave cylindrical portion co-operates with a convex cylindrical portion.

The above-mentioned cylindrical surfaces are effectively in contact in a thrust roller bearing, the race dimensions of which can be calculated from the geometrical form of the separators used.

The same apertured separators of known type, used in a thrust bearing with cylindrical rollers whose race has different radial dimensions, then no longer allow a true contact surface between them. In fact, in the case of a thrust bearing whose race dimensions are larger, the separators touch along a single line of contact, which is the generatrix of the intended contact surface most distant from the axis of the thrust bearing. Conversely, in the case of a bearing thrust whose radial dimensions are smaller, the separators touch at the generatrix of the intended contact surface closest to the axis of the thrust bearing. These linear contacts cause an angular deviation of the axes of the rollers contained in these apertured separators whose cylindrical surfaces are not in contact with each other. The rollers, whose axes are then removed from their ideal positions, wear prematurely.

SUMMARY OF THE INVENTION

The apertured separators designed to form the roller cage of a roller bearing in accordance with the invention enable this disadvantage to be avoided. Whatever the diameters of the roller bearings used may be, the successive separators are applied to each other in pairs over a true contact surface. An additional advantage of the apertured separators in accordance with the invention resides in the fact that these separators may be used in any bearings using the same rollers, i.e., thrust and other roller bearings, the successive separators still being applied to each other over a true contact surface, whatever may be the nature of the roller bearing in which they are mounted.

The apertured separators forming the roller cage which is the object of the invention are symmetrical about a plane containing the roller axis. They have two portions with spherical surfaces of the same radius and which are symmetrical about the plane of symmetry of the separator, these two portions being adapted to form the contact surfaces between successive separators.

In a roller cage made of apertured separators in accordance with the invention, two types of apertured separators are alternately interlocked in each other. The first have concave spherical surfaces and the second convex spherical surfaces. The radii of the spherical surfaces of the two types of apertured separators are equal.

A symmetrical housing in the form of a portion of a surface of revolution formed in each separator retains a roller inserted in the said separator by force through one of the two openings placing the said housing in communication with the outside. To permit this insertion, the separators in accordance with the invention will advantageously be made of an elastic material, for example a plastic material. A play exists to allow a roller a certain amount of movement towards one or the other of the openings of the aperture.

The point situated at mid-height of the axis of revolution of the said housing being termed the center of the housing, the fact that the center of the housings of the separators of at least one of the above-mentioned two types are situated at a certain distance from a straight line joining the centers of the above-mentioned spherical surfaces forms part of the present invention.

In fact, in a complete cage consisting of a certain number of separators of the two above-mentioned types and also defined by a certain single angle which each of the axes of the housing must form with the axis of the complete cage, the centers of the housings are inscribed on a common circle, due to appropriate spacing of the center of the housing of at least one of the two types of separator from the straight line joining the center of its spherical surfaces.

Any cage for a roller bearing may be formed with separators provided for a different complete cage. Because of the above-mentioned movement permitted to each roller in its housing the axes of the rollers may be arranged, depending on the case in question, on a same cone with a circular base whose axis is the axis of the cage, on a same cylinder of revolution centered on the axis of the cage, or lastly in a same place perpendicular to the axis of the cage.

Therefore, with the separators of the two abovementioned types, roller cages can be formed without differentiation for thrust roller bearings, for cylindrical journal bearings and for taper bearings.

BRIEF DESCRIPTION OF THE DRAWINGS

The invention may be performed in many ways and various specific embodiments will now be described by way of example with reference to the accompanying drawings in which

FIG. 7 is a plan view of a portion of a thrust bearing with tapered rollers, the upper ring of which has been removed, and FIG. 8 is a section on the line VIII—VIII of FIG. 7.

DESCRIPTION OF THE PREFERRED EMBODIMENTS

Figure 1:
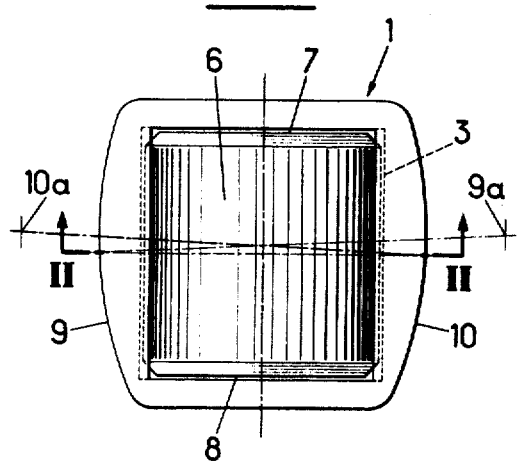
FIG. 1 is a plan view of one embodiment of an apertured separator for a cylindrical roller according to the invention.
Figure 2:
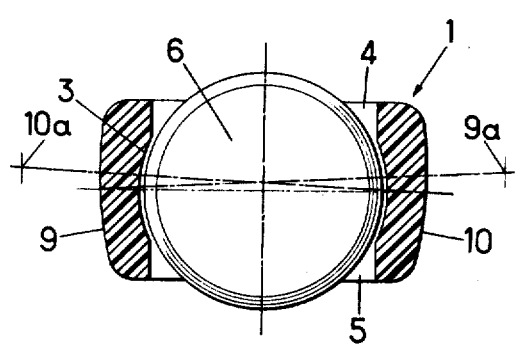
FIG. 2 is a section of the line II—II of FIG. 1.

An apertured separator 1 of the first embodiment in accordance with the invention is shown in FIGS. 1 and 2. It comprises a cylindrical housing 3 opening out through two apertures 4 and 5. In the cylindrical housing 3 which may be formed of a plastic material is elastically encased a cylindrical roller 6, the diameter of which is slightly greater than the width of apertures 4 or 5, and the cylindrical roller 6 is forced through one of the apertures 4,5 and then remains imprisoned in the cylindrical housing 3. The height of the roller 6 is less than the height of the cylindrical housing 3, so that the roller 6 has an axial play indicated at 7 and 8 in the cylindrical housing 3. The radius of the cylindrical housing 3 is greater than the radius of the roller 6, which permits a certain amount of movement of the cylindrical roller 6 placed in the housing 3 towards one of the apertures 4 or 5.

The apertured separator of this first embodiment has two convex spherical surfaces 9 and 10 of the same radius, which are symmetrical with respect to one another and whose centers are indicated by the reference numerals 9a and 10a.

Figure 3:
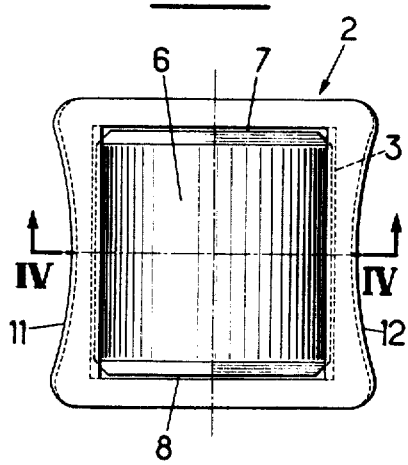
FIG. 3 is a plan view of a second embodiment of an apertured separator for a cylindrical roller according to the invention.
Figure 4:
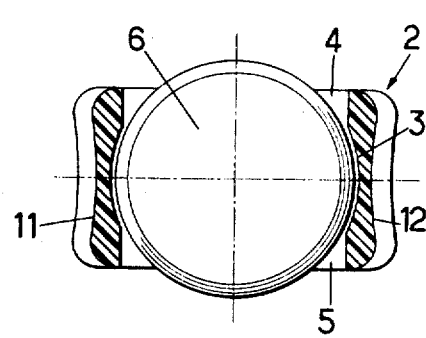
FIG. 4 is a section of the lince IV—IV of FIG. 3.

An apertured separator 2 of a second embodiment according to the invention is shown in FIGS. 3 and 4. The same reference numbers as in FIGS. 1 and 2 have been used to indicate like parts which are substantially identical to those of the separator described above, and will not again be described. This separator 2 has two concave spherical surfaces 11 and 12 of the same radius and which are symmetrical about the center of the cylindrical housing 3. The radius of these concave spherical surfaces 11 and 12 is equal to the radius of the convex spherical surface 9 and 10 of the separator 1 described above.

The apertured separators of the first and second embodiments are designed to interlock alternately in each other with their spherical surfaces to form roller cages of bearings with cylindrical rollers. Two examples of roller cages formed from these separators are described in FIGS. 5 and 6.

Figure 5:
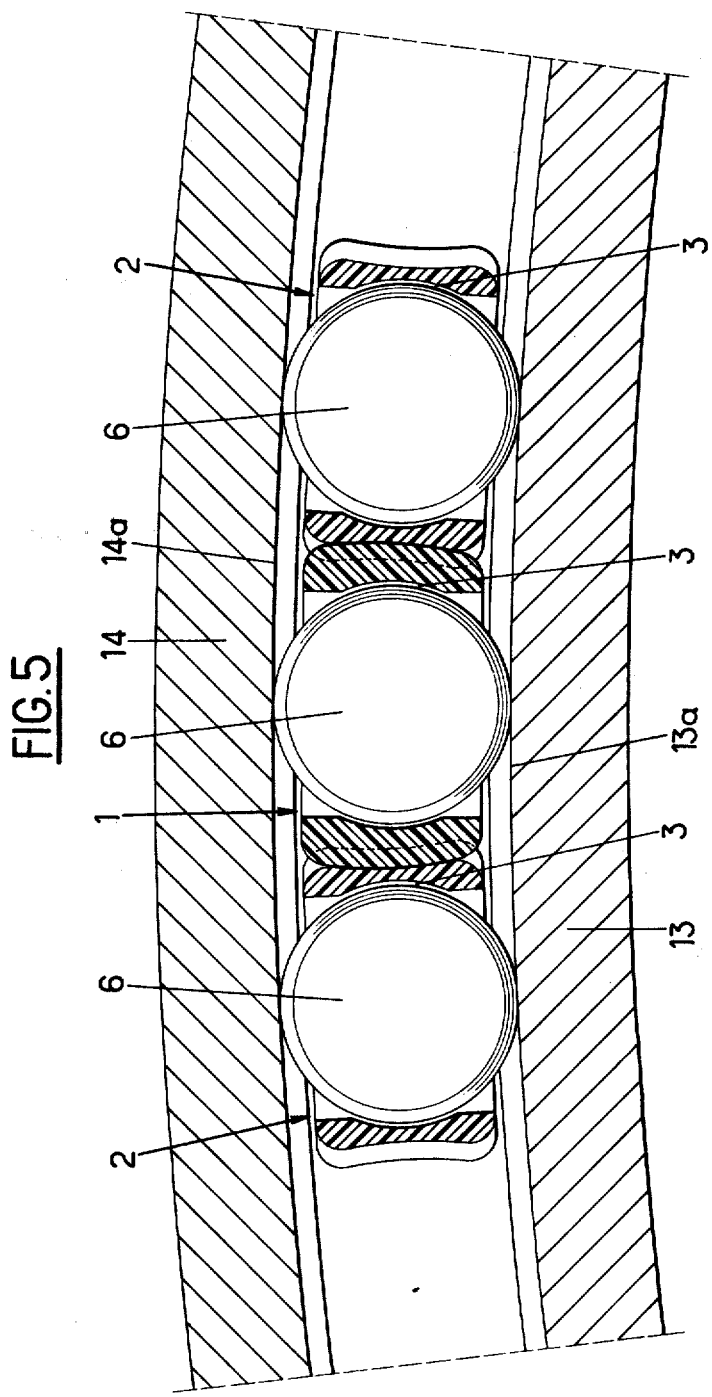
FIG. 5 is a section of a portion of a bearing with cylindrical rollers and cylindrical journal, the section being taken perpendicularly to the bearing axis.

FIG. 5 shows in section the inner ring 13 and the outer ring 14 of a bearing with cylindrical rollers and for a cylindrical journal together with three apertured separators containing rollers 6 retained on one side by an inner race 13a and on the other side by an outer race 14a. The apertured separator 1 is an apertured separator of the first embodiment described above with reference to FIGS. 1 and 2. The separators 2 are separators of the second embodiment as described above with reference to FIGS. 3 and 4. The radii of the inner and outer races 13a and 14a enable the rollers 6 to be placed exactly at the centers of their respective cylindrical housings 3 as described above.

Figure 6:
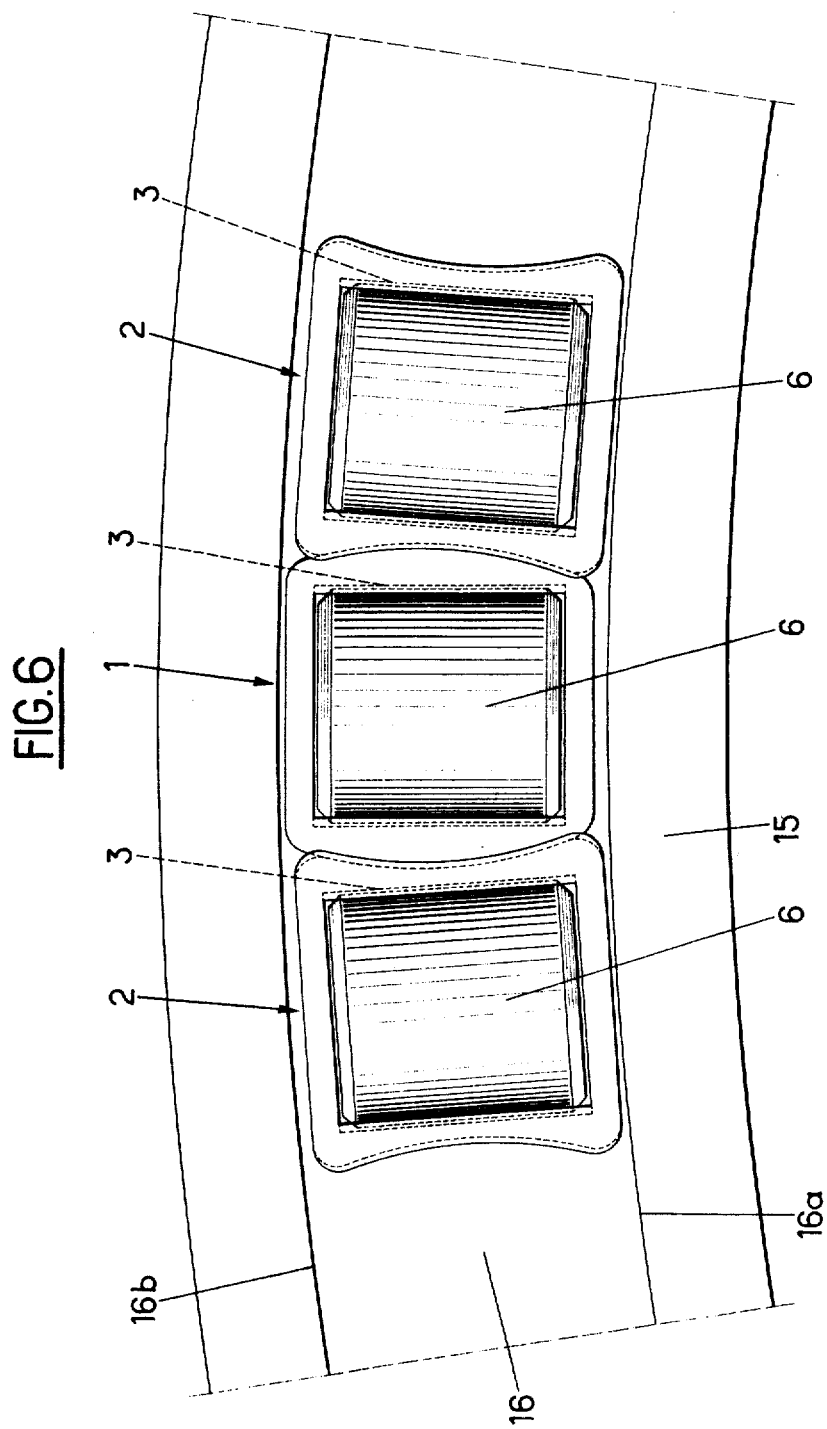
FIG. 6 is a plan view of a portion of a thrust bearing with cylindrical rollers, the upper ring of which has been removed.

In the portion of a thrust bearing with cylindrical rollers shown in FIG. 6, only the lower ring 15 has been shown. This has a race 16 the sides of which are formed by an inner shoulder 16a and an outer shoulder 16b. Three apertured separators contain rollers which run on the race 16. The apertured separator 1 is an apertured separator of the first embodiment as described above with reference to FIGS. 1 and 2, and the two separators 2 are separators of the second embodiment as described above with reference to FIGS. 3 and 4. It will be observed that the rollers 6 situated in the centers of their respective cylindrical housings 3 are not positioned on a same pitch circle, the rollers of the separators 2 being closer to the center of the thrust bearing than that of the separator 1. In the thrust bearing shown in part of FIG. 6, the separators 2 of the second embodiment are guided by the shoulder 16a and the separators 1 of first embodiment are retained radially and guided by the shoulder 16b.

In addition to the use of these separators of the first and second embodiments in a roller cage for bearings with cylindrical rollers it is also possible to use them for tapered journals, for which they are also perfectly suitable. In this case the geometrical arrangement of these separators is an intermediate position between those shown in the two examples of bearings for a cylindrical journal of FIG. 5 and of the thrust roller bearing of FIG. 6. The rollers adopt their ideal positions, using the axial play permitted in the cylindrical housing and the radial play existing between the lateral surfaces of the rollers and of the respective chambers.

In the portion of a thrust bearing with tapered rollers of FIGS. 7 and 8, only the lower ring 17 has been shown. This has a frusto-conical race 18 the side of which is formed by a shoulder 18a. Three separators shown in FIG. 7 respectively contain three tapered rollers 106 in respective housings 103. The separator 101 is of the first embodiment such as described above with reference to FIGS. 1 and 2 and whose housing 103 is frusto-conical to receive the roller 106. The separators 102 are of the second embodiment such as described above with reference to FIGS. 3 and 4 and their housings 103 are similarly adapted to receive the tapered rollers 106.

In this thrust bearing, the rollers are retained by the shoulder 18a. The separators are not guided, but the radial play 103a has been removed in the separators 101 and they cannot move radially outwards. A radial play 103a exists for the separators of the second embodiment 102. For these two types of separators 101 and 102 the upper and lower axial plays 107 and 108 respectively have large dimensions and are not necessarily equal in value.

The separators of the first and second embodiments described in this invention permit the formation of any bearing cages with cylindrical or tapered rollers of any type.

It will be understood that various changes, improvements or additions may be made to the embodiments which have been described, or certain elements replaced by equivalent elements, without thus deteriorating the general efficacity of the invention.

What we claim is:

1. A roller cage for a roller bearing assembly comprising first and second apertured separators alternately interlocked in one another and each having a housing provided with two apertures, a roller adapted to be received in the housing through one of the apertures and resiliently encased therein, each housing being symmetrical about the axis of revolution of the roller and having its symmetrical center at the mid height of the axis of symmetry, the said first and second separators each having two part spherical surfaces symmetrical about a plane of symmetry containing the axis of the housing and the axis of the cage, the part spherical surfaces on the first separators being convex and those of the second separators being concave and the radius of curvature of the convex surfaces being equal to the curvature of the concave surfaces.

2. A roller cage as claimed in claim 1, in which the centers of the housings of at least one of the first and second separators are situated at a predetermined distance from a straight line joining the centers of the spherical surfaces, so that in a complete cage comprising a number of first and second separators and also defined by a predetermined angle which each of the axes of the housings forms with the axis of the said complete cage, the centers of all the housings are inscribed on the same pitch circle situated in a plane perpendicular to the axis of the complete cage.

3. A roller cage as claimed in claim 1, in which the housings of the first and second separators have an internal form permitting predetermined movement of a roller elastically encased in a housing, the axis of the roller remaining parallel to itself and moving in the plane of symmetry.

4. A roller cage as claimed in claim 3, wherein the first and second separators are arranged such that because of the movement permitted to each roller, the axes of the rollers are situated on the same mean cone with a circular base, the apex of which is situated on the axis of the cage.

5. A roller cage as claimed in claim 3, wherein the first and second separators are arranged such that because of the said movement permitted to each roller, the axes of the rollers are situated on a cylinder of revolution centered on the axis of the cage.

6. A roller cage as claimed in claim 3 wherein the first and second separators form a thrust roller bearing cage, the arrangement being such that because of the said movement permitted to each roller, the axes of the rollers are situated in a plane perpendicular to the axis of the cage.

7. A roller cage as claimed in claim 1 in which the cage forms a roller bearing and in which the said bearing is a thrust roller bearing.

8. A roller cage as claimed in claim 7 in which the rollers are cylindrical and the housings of the separators are cylindrical.

9. A roller cage as claimed in claim 7 in which the said rollers are frusto-conical and the housings of separators are frusto-conical.

10. A roller cage as claimed in claim 1, in which the cage forms a roller bearing.

11. A roller cage as claimed in claim 10 in which the rollers are cylindrical and the housings of the separators are cylindrical.

12. A roller cage as claimed in claim 10 in which the said rollers are frusto-conical and the housing of the separators are frusto-conical.

* * * * *